United States Patent
Ong et al.

(10) Patent No.: US 11,188,591 B2
(45) Date of Patent: *Nov. 30, 2021

(54) VIDEO MATCHING SERVICE TO OFFLINE COUNTERPART

(71) Applicant: Gracenote Media Services, LLC, New York, NY (US)

(72) Inventors: Edwin Seng Eng Ong, San Francisco, CA (US); Aleksandra R. Vikati, San Francisco, CA (US); Brian T. Schroeder, San Francisco, CA (US); Joel H. Wood, San Francisco, CA (US); Min Kyung M. Chang, Walnut Creek, CA (US)

(73) Assignee: GRACENOTE MEDIA SERVICES, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,329

(22) Filed: Mar. 8, 2019

(65) Prior Publication Data

US 2019/0205339 A1    Jul. 4, 2019

Related U.S. Application Data

(63) Continuation of application No. 15/187,663, filed on Jun. 20, 2016, now Pat. No. 10,229,198, which is a
(Continued)

(51) Int. Cl.
*H04N 21/84*    (2011.01)
*G06F 16/71*    (2019.01)
(Continued)

(52) U.S. Cl.
CPC ........... *G06F 16/735* (2019.01); *G06F 16/71* (2019.01); *G06F 16/7867* (2019.01);
(Continued)

(58) Field of Classification Search
USPC ....................................................... 707/769
See application file for complete search history.

(56) References Cited

U.S. PATENT DOCUMENTS

| 5,436,653 A | 7/1995 | Ellis et al. |
| 6,549,922 B1 | 4/2003 | Srivastava et al. |

(Continued)

OTHER PUBLICATIONS

Yeo et al., "Retrieving and visualizing video", Communications of the ACM, vol. 40, Issue 12, Dec. 1997, 2 pages.
(Continued)

*Primary Examiner* — Nnenna N Ekpo
(74) *Attorney, Agent, or Firm* — Hanley, Flight & Zimmerman, LLC

(57) ABSTRACT

Methods and apparatus for video matching service to offline counterpart are disclosed. An example method includes accessing an address for an online media asset, accessing metadata associated with the online media asset, wherein the metadata includes an asset attribute, determining whether the asset attribute identifies at least one of a cast member or crew member, and matching the online media asset to an offline media asset by prioritizing offline media assets having a matching asset attribute, the offline media asset including at least one of audio or video.

20 Claims, 15 Drawing Sheets

Related U.S. Application Data continuation of application No. 13/460,477, filed on Apr. 30, 2012, now Pat. No. 9,398,350, which is a continuation-in-part of application No. 11/891,301, filed on Aug. 8, 2007, now Pat. No. 8,745,684.

(60) Provisional application No. 60/821,704, filed on Aug. 8, 2006.

(51) Int. Cl.
| | | |
|---|---|---|
| *H04N 21/4782* | (2011.01) | |
| *G06F 16/735* | (2019.01) | |
| *G06F 16/78* | (2019.01) | |
| *G06F 16/9535* | (2019.01) | |
| *H04N 21/231* | (2011.01) | |
| *G06Q 10/10* | (2012.01) | |
| *H04L 29/08* | (2006.01) | |

(52) U.S. Cl.
CPC ......... *G06F 16/9535* (2019.01); *G06Q 10/10* (2013.01); *H04N 21/23109* (2013.01); *H04N 21/4782* (2013.01); *H04N 21/84* (2013.01); *H04L 67/02* (2013.01); *H04L 67/104* (2013.01)

(56) References Cited

U.S. PATENT DOCUMENTS

| | | | |
|---|---|---|---|
| 6,718,324 B2 | 4/2004 | Edlund et al. | |
| 6,925,197 B2* | 8/2005 | Dimitrova | G06K 9/00711 |
| | | | 382/118 |
| 6,973,663 B1 | 12/2005 | Brown et al. | |
| 7,162,691 B1 | 1/2007 | Chatterjee et al. | |
| 7,305,692 B2 | 12/2007 | Blackketter et al. | |
| 7,308,464 B2* | 12/2007 | Nowitz | G06F 16/951 |
| 7,546,289 B2 | 6/2009 | Westphal | |
| 7,657,151 B2 | 2/2010 | Goodwin et al. | |
| 8,745,684 B1 | 6/2014 | Ong et al. | |
| 9,166,714 B2 | 10/2015 | Barve et al. | |
| 9,258,609 B2 | 2/2016 | Ordyna et al. | |
| 9,398,350 B1 | 7/2016 | Ong et al. | |
| 9,507,823 B2 | 11/2016 | Hegde et al. | |
| 10,229,198 B2 | 3/2019 | Ong et al. | |
| 2003/0028896 A1 | 2/2003 | Swart et al. | |
| 2003/0101415 A1* | 5/2003 | Chang | G06F 40/137 |
| | | | 715/231 |
| 2004/0003403 A1 | 1/2004 | Marsh | |
| 2005/0196139 A1 | 9/2005 | Blackketter et al. | |
| 2006/0026647 A1* | 2/2006 | Potrebic | H04N 5/44582 |
| | | | 725/53 |
| 2006/0146436 A1* | 7/2006 | Goodwin | G11B 19/025 |
| | | | 360/69 |
| 2006/0236343 A1 | 10/2006 | Chang | |
| 2010/0057694 A1 | 3/2010 | Kunjithapatham et al. | |
| 2010/0217781 A1 | 8/2010 | Benhadda et al. | |
| 2011/0145847 A1 | 6/2011 | Barve et al. | |
| 2012/0233640 A1 | 9/2012 | Odryna et al. | |

OTHER PUBLICATIONS

United States Patent and Trademark Office, "Notice of Allowance," issued in connection with U.S. Appl. No. 15/187,663, dated Oct. 26, 2018, 15 pages.

United States Patent and Trademark Office, "Final Office Action," issued in connection with U.S. Appl. No. 13/460,477, dated Aug. 22, 2013, 12 pages.

United States Patent and Trademark Office, "Final Office Action," issued in connection with U.S. Appl. No. 13/460,477, dated May 28, 2015, 13 pages.

United States Patent and Trademark Office, "Non-Final Office Action," issued in connection with U.S. Appl. No. 13/460,477, dated Mar. 14, 2013, 12 pages.

United States Patent and Trademark Office, "Non-Final Office Action," issued in connection with U.S. Appl. No. 13/460,477, dated Feb. 4, 2015, 13 pages.

United States Patent and Trademark Office, "Notice of Allowance," issued in connection with U.S. Appl. No. 13/4160,477, dated Apr. 18, 2016, 7 pages.

United States Patent and Trademark Office, "Notice of Allowance," issued in connection with U.S. Appl. No. 13/460,477, dated Apr. 18, 2016, 7 pages.

United States Patent and Trademark Office, "Non-Final Office Action," issued in connection with U.S. Appl. No. 11/891,301, dated Mar. 23, 2010, 10 pages.

United States Patent and Trademark Office, "Final Office Action," issued in connection with U.S. Appl. No. 11/891,301, dated Sep. 17, 2010, 14 pages.

United States Patent and Trademark Office, "Notice of Allowance," issued in connection with U.S. Appl. No. 11/891,301, dated Feb. 6, 2014, 12 pages.

\* cited by examiner

Browser

TV Listings       National Grid   Eastern  — 302

Watch Nilita Now — 304

Doublecrest
S02, E16 (First Aired: March 16, 2012) — 306
After a series of Division agents are assassinated, Armando discovers that Percival is behind the murders; Nilita receives a tempting offer. — 308

| Free — 310 | Paid — 312 | |
|---|---|---|
| Hulru | Amazar.com | $2.99 HD |
| The WM | Hulru | Subscription HD |
| XCable | iTones Store | $2.99 HD $1.99 |
| | Amazar.com | $1.99 |
| | VODO | $1.99 |

Previous Episode

Originals

S02,E15 (First Aired: February 17, 2012) Michaela and Nilita try to help Carlos (Eric Gempla) remember her past in hope of recovering information that could take down Division; Alexis makes an announcement at a Zetrov press conference.

Watch Online

Next Episode

Rising

S02, E17 (First Aired: March 23, 2012) When Michaela learns Carter has been keeping a secret, he and Nilita go to Moscow to confront her; Alexis sends out a coded message, hoping to find her mother.

Watch Online

[See all episodes]

FIG. 3

SEARCH FOR A MOVIE: MISSION IMPOSSIBLE — 404

| ROOT ID | TMS ID | YEAR | EPISODE TITLE | MATCHES |
|---|---|---|---|---|
| 18045 | MV000462350000 | 1996 | MISSION: IMPOSSIBLE | 9 |
| 25485 | MV000907030000 | 2000 | MISSION: IMPOSSIBLE 2 | 7 |
| 149488 | MV001715570000 | 2006 | MISSION: IMPOSSIBLE III | 10 |
| 8493689 | MV003471370000 | 2011 | MISSION: IMPOSSIBLE -- GHOST PROTOCOL | 4 |

MANUALLY MATCH A VIDEO — 402 — LOOKUP VIDEO

MATCHES FOR MISSION: IMPOSSIBLE

| STATE | VIDEO TITLE | AIR DATE | HOST |
|---|---|---|---|
| MATCHED | MISSION: IMPOSSIBLE | | HBO |
| MATCHED | MISSION: IMPOSSIBLE | 1996-05-22T00:00:00 | AMAZON.COM |
| MATCHED | MISSION: IMPOSSIBLE | | iTUNES STORE |
| MATCHED | MISSION: IMPOSSIBLE | 1996-05-22T00:00:00 | AMAZON.COM |
| MATCHED | MISSION: IMPOSSIBLE | 1996-05-22T00:00:00 | AMAZON.COM |
| MATCHED | MISSION: IMPOSSIBLE | 1996 | BLOCKBUSTER |
| MATCHED | MISSION: IMPOSSIBLE | 1998-11-17 | iTUNES STORE |
| MATCHED | MISSION: IMPOSSIBLE | 1996-05-22 | VUDU |
| MATCHED | MISSION: IMPOSSIBLE | 1996 | CINEMANOW |

POTENTIAL MATCHES FOR MISSION: IMPOSSIBLE

| VIDEO TITLE | AIR DATE | HOST |
|---|---|---|
| LOG 1: THE IMPOSSIBLE MISSION | 1968 | NETFLIX |
| MISSION: IMPOSSIBLE (HBO) | | XFINITY |
| AMERICA'S GIANT PHILANTHROPIES: MISSION IMPOSSIBLE? | JAN 29, 1993, 3:01 A.M. | PBS |
| SUPER SEXY SPIES! -- MISSION IMPOSSIBLE: GHOST PROTOCOL FILM REVIEW | | YOUTUBE |

FIG. 4A

| | DASHBOARD. NETWORK PRIOR X | | | | | |
|---|---|---|---|---|---|---|
| ← → C | DASHBOARD . CASTTV.COM/#SUBSECTION=UNMATCHED | | | | | ☆ 🔧 |

| CASTTV EDITORIAL TOOLS | DASHBOARD | ONLINE TV MATCHER | ONLINE MOVIE MATCHER | | PROFILE LOGOUT |
|---|---|---|---|---|---|
| | OVERVIEW | UNMATCHED | MULTI-MATCH | RECENTLY CRAWLED | NETWORK PRIORITIES |

UNMATCHED VIDEO REPORT

BLACKLIST        412        FROM (2012-04-14) TO (2012-04-17) [REFRESH]

PRIORITY FILTERS [SELECT A PROVIDER ▾] [PRIORITY ▾] VIEW FILTERS SPECIALS: ☐

| | SHOW | UNMATCHED VIDEOS | TYPE | PROVIDER(S) |
|---|---|---|---|---|
| | MEET THE BROWNS | 40 | EPISODE | AMAZON.COM |
| | TREME | 22 | EPISODE | AMAZON.COM |
| | KING GEUNCHOGO | 17 | EPISODE | HULU |
| | HARICHANDANAM | 16 | EPISODE | YOUTUBE |
| | APOLLO JUSTICE: ACE ATTORNEY | 16 | EPISODE | YOUTUBE |
| | TRAVEL GRILLS | 13 | EPISODE | YOUTUBE |
| | 16X9 | 12 | EPISODE | YOUTUBE |
| | WITHOUT MOTIVE | 12 | EPISODE | AMAZON.COM |
| | RESIDENT EVIL: OPERATION RACCOON CITY | 12 | EPISODE | YOUTUBE |
| | THE WAR ZONE | 11 | EPISODE | NETFLIX |
| | THE DAILY LEAGUE | 11 | EPISODE | YOUTUBE |
| | BUBBLEGUM CRISIS TOKYO 2040 | 10 | EPISODE | YOUTUBE |
| | SAMURAI CHAMPLOO | 10 | EPISODE | YOUTUBE |
| | UFC 141 | 10 | EPISODE | ITUNES STORE |
| | ANOTHER | 9 | EPISODE | HULU |
| | THE MENTOR | 8 | EPISODE | NETFLIX |
| | PEACEMAKER | 7 | EPISODE | HULU |
| | BODACIOUS SPACE PIRATES | 7 | EPISODE | HULU |
| X ☆ | MISSION:IMPOSSIBLE GHOST PROTOCOL —414 | 4 | MOVIE | AMAZON.COM, YOUTUBE |
| | 218425805   2011   MISSION: IMPOSSIBLE GHOST PROTOCOL<br>AGENT ETHAN HUNT AND HIS ELITE TEAM GO UNDERGROUND AFTER A BOMBING IMPLICATES THE IMF AS TERRORIS..... | | | |
| | 218429271   2011-12-16T00:00:00   MISSION: IMPOSSIBLE GHOST PROTOCOL<br>NO PLAN. NO BACKUP. NO CHOICE. AGENT ETHAN HUNT(TOM CRUISE) AND HIS ELITE TEAM (JEREMY RENNER, T..... | | | |
| | 218429313   2011-12-16T00:00:00   MISSION: IMPOSSIBLE GHOST PROTOCOL<br>NO PLAN. NO BACKUP. NO CHOICE. AGENT ETHAN HUNT(TOM CRUISE) AND HIS ELITE TEAM (JEREMY RENNER, T..... | | | |
| | 218429376   2011-12-16T00:00:00   MISSION: IMPOSSIBLE GHOST PROTOCOL<br>NO PLAN. NO BACKUP. NO CHOICE. AGENT ETHAN HUNT(TOM CRUISE) AND HIS ELITE TEAM (JEREMY RENNER, T..... | | | |
| | SHIKL | 4 | EPISODE | HULU |
| | SOL | 4 | MOVIE | AMAZON.COM, VUDU |
| | A CERTAIN MAGICAL INDEX | 4 | EPISODE | HULU |
| | PANDORA'S TOWER | 4 | EPISODE | YOUTUBE |

MATCHES FOR THE GOOD WIFE

Matching (432) | Advanced | Diff

| S | EP | EPISODE TITLE | AIR DATE | MATCHES |
|---|----|---------------|----------|---------|
| 3 | 22 | THE DREAM TEAM | 2012-04-29 | 0 |
| 3 | 21 | THE PENALTY BOX | 2012-04-22 | 0 |
| 3 | 20 | PANTS ON FIRE | 2012-04-15 | 4 |
| 3 | 19 | BLUE RIBBON PANEL | 2012-03-25 | 7 |
| 3 | 18 | GLOVES COME OFF | 2012-03-18 | 7 |
| 3 | 17 | LONG WAY HOME | 2012-03-11 | 7 |
| 3 | 16 | AFTER THE FALL | 2012-03-04 | 7 |
| 3 | 15 | LIVE FROM DAMASCUS | 2012-02-19 | 7 |
| 3 | 14 | ANOTHER HAM SANDWICH | 2012-01-29 | 7 |
| 3 | 13 | BITCOIN FOR DUMMIES | 2012-01-15 | 8 |
| 3 | 12 | ALIENATION OF AFFECTION | 2012-01-08 | 7 |
| 3 | 11 | WHAT WENT WRONG | 2011-12-11 | 7 |
| 3 | 10 | PARENTING MADE EASY | 2011-12-04 | 7 |
| 3 | 9 | WHISKEY TANGO FOXTROT | 2011-11-20 | 7 |
| 3 | 8 | DEATH ROW TIP | 2011-11-13 | 6 |
| 3 | 7 | EXECUTIVE ORDER 13224 | 2011-11-06 | 6 |
| 3 | 6 | AFFAIRS OF STATE | 2011-10-30 | 7 |
| 3 | 5 | MARTHAS AND CAITLINS | 2011-10-23 | 7 |
| 3 | 4 | FEEDING THE RAT | 2011-10-16 | 6 |
| 3 | 3 | GET A ROOM | 2011-10-09 | 6 |
| 3 | 2 | THE DEATH ZONE | 2011-10-02 | 7 |
| 3 | 1 | A NEW DAY | 2011-09-25 | 10 |
| 2 | 23 | CLOSING ARGUMENTS | 2011-05-17 | 7 |
| 2 | 22 | GETTING OFF | 2011-05-10 | 6 |
| 2 | 21 | IN SICKNESS | 2011-05-03 | 8 |
| 2 | 20 | FOREIGN AFFAIRS | 2011-04-12 | 10 |
| 2 | 19 | WRONGFUL TERMINATION | 2011-04-05 | 7 |
| 2 | 18 | KILLER SONG | 2011-03-29 | 7 |
| 2 | 17 | HAM SANDWICH | 2011-03-22 | 8 |
| 2 | 16 | GREAT FIREWALL | 2011-03-01 | 8 |
| 2 | 15 | SILVER BULLET | 2011-02-22 | 4 |
| 2 | 14 | NET WORTH | 2011-02-15 | 6 |
| 2 | 13 | REAL DEAL | 2011-02-08 | 7 |

434

| STATE | VIDEO TITLE | AIR DATE | HOST |
|-------|-------------|----------|------|
| VERIFIED | BLUE RIBBON PANEL | 2012-03-25 | CBS |
| VERIFIED | BLUE RIBBON PANEL | 2012-03-25 | ITUNES STORE |
| VERIFIED | BLUE RIBBON PANEL | 2012-03-25 | AMAZON.COM |
| VERIFIED | THE GOOD WIFE - BLUE RIBBON PANEL | 2012-03-25 | XFINITY |
| MATCHED | BLUE RIBBON PANEL [HD] | 2012-03-25 | AMAZON.COM |
| MATCHED | BLUE ROBBON PANEL | 2012-03-25 | VUDU |
| MATCHED | BLUE RIBBON PANEL | | TV.COM |

435

| STATE | UNMATCHED VIDEO TITLE | AIR DATE | HOST |
|-------|----------------------|----------|------|
| | THE GOOD WIFE | | NETFLIX |

MANUAL MATCH [         ] [LOOKUP VIDEO]

FIG. 4D

| | 436 | | 438 | |
|---|---|---|---|---|
| ************ | TITLE TRUE EQUALITY ACCEPT | VERIFIED | | REMOVE VERIFICATION |

| TITLE | PARTS | | TITLE | DESCRIPTION | IMAGES |
|---|---|---|---|---|---|
| BLUE RIBBON PANEL | DESCRIPTION | ROOT ID | BLUE RIBBON PANEL | WHEN ALICIA IS ASSIGNED TO BE | |
| EPISODE | WHILE ON A PANEL INVESTIGATING A | 9103515 | EPISODE | ON A BLUE RIBBON PANEL | |
| S 3, E 19 | POLICE SHOOTING, ALICIA STARTS TO | APOLLO ID | S 3, E 19 | INVESTIGATING A POLICE SHOOTING, | |
| ORIGINAL AIR DATE | WONDER ABOUT THE CHAIRMAN'S | EP011583840066 | AIR DATE | SHE BEGINS TO QUESTION THE | |
| 2012-03-25 | ACTIONS; **** IRS STARTS LOOKING AT | | 2012-03-25 (0:43:55) | MOTIVATIONS BEHIND THE | |
| SYNDICATION ID | KALINDA. | | CONTENT | CHAIRMAN'S ACTIONS (GUEST STAR | |
| | | | CBS  CASTTV | MATTHEW PERRY). MEANWHILE, | |
| | | | | KALINDA RECEIVES UNWANTED | |
| | | | | ATTENTION FROM THE IRS. | |

FIG. 4D (Cont.)

MATCHES FOR GOSSIP GIRL

| MATCHING | ADVANCED 442 | DIFF |

STATE: ALL

| S | EP | EPISODE TITLE | AIR DATE | STATE | VIDEO TITLE | AIR DATE | HOST |
|---|----|---------------|----------|-------|-------------|----------|------|
| 5 | 20 | SALON OF THE DEAD | 2012-04-16 | MATCHED | SALON OF THE DEAD | 2012-04-16 | THE CW |
| 5 | 20 | SALON OF THE DEAD | 2012-04-16 | MATCHED | SALON OF THE DEAD | 2012-04-16 | AMAZON.COM |
| 5 | 20 | SALON OF THE DEAD | 2012-04-16 | MATCHED | SALON OF THE DEAD | | CINEMANOW |
| 5 | 20 | SALON OF THE DEAD | 2012-04-16 | MATCHED | SALON OF THE DEAD | 2012-04-16 | HULU |
| 5 | 20 | SALON OF THE DEAD | 2012-04-16 | MATCHED | SALON OF THE DEAD | 2012-04-16 | iTUNES STORE |
| 5 | 20 | SALON OF THE DEAD | 2012-04-16 | MATCHED | SALON OF THE DEAD [HD] | 2012-04-16 | AMAZON.COM |
| 5 | 19 | IT GIRL, INTERRUPTED | 2012-04-09 | VERIFIED | IT GIRL, INTERRUPTED | 2012-04-09 | iTUNES STORE |
| 5 | 19 | IT GIRL, INTERRUPTED | 2012-04-09 | VERIFIED | IT GIRL, INTERRUPTED | 2012-04-09 | AMAZON.COM |
| 5 | 19 | IT GIRL, INTERRUPTED | 2012-04-09 | VERIFIED | IT GIRL, INTERRUPTED | 2012-04-09 | THE CW |
| 5 | 19 | IT GIRL, INTERRUPTED | 2012-04-09 | VERIFIED | IT GIRL, INTERRUPTED | | CINEMANOW |
| 5 | 19 | IT GIRL, INTERRUPTED | 2012-04-09 | VERIFIED | IT GIRL, INTERRUPTED | 2012-04-09 | HULU |
| 5 | 19 | IT GIRL, INTERRUPTED | 2012-04-09 | VERIFIED | IT GIRL, INTERRUPTED [HD] | 2012-04-09 | AMAZON.COM |
| 5 | 19 | IT GIRL, INTERRUPTED | 2012-04-09 | CRAFTED | IT GIRL, INTERRUPTED | 2012-04-09 | VUDU |
| 5 | 18 | CON HEIR | 2012-04-02 | VERIFIED | CAN HEIR | 2012-04-02 | AMAZON.COM |
| 5 | 18 | CON HEIR | 2012-04-02 | VERIFIED | CAN HEIR | 2012-03-26 | THE CW |
| 5 | 18 | CON HEIR | 2012-04-02 | VERIFIED | CAN HEIR | 2012-04-02 | HULU |
| 5 | 18 | CON HEIR | 2012-04-02 | VERIFIED | CAN HEIR [HD] | 2012-04-02 | AMAZON.COM |
| 5 | 18 | CON HEIR | 2012-04-02 | VERIFIED | CAN HEIR | | CINEMANOW |
| 5 | 18 | CON HEIR | 2012-04-02 | VERIFIED | CAN HEIR | 2012-04-02 | VUDU |
| 5 | 18 | CON HEIR | 2012-04-02 | VERIFIED | CAN HEIR | 2012-04-02 | iTUNES STORE |
| 5 | 17 | THE PRINCESS DOWRY | 2012-02-27 | VERIFIED | THE PRINCESS DOWRY | 2012-02-27 | THE CW |
| 5 | 17 | THE PRINCESS DOWRY | 2012-02-27 | VERIFIED | THE PRINCESS DOWRY | 2012-02-27 | iTUNES STORE |
| 5 | 17 | THE PRINCESS DOWRY | 2012-02-27 | VERIFIED | THE PRINCESS DOWRY | 2012-02-27 | AMAZON.COM |
| 5 | 17 | THE PRINCESS DOWRY | 2012-02-27 | VERIFIED | THE PRINCESS DOWRY | 2012-02-27 | HULU |
| 5 | 17 | THE PRINCESS DOWRY | 2012-02-27 | VERIFIED | THE PRINCESS DOWRY [HD] | 2012-02-27 | AMAZON.COM |
| 5 | 17 | THE PRINCESS DOWRY | 2012-02-27 | VERIFIED | THE PRINCESS DOWRY | 2012-02-27 | VUDU |
| 5 | 17 | THE PRINCESS DOWRY | 2012-02-27 | VERIFIED | THE PRINCESS DOWRY | 2012-02-27 | XFINITY |
| 5 | 17 | THE PRINCESS DOWRY | 2012-02-27 | VERIFIED | THE PRINCESS DOWRY | | CINEMANOW |
| 5 | 16 | CROSS RHODES | 2012-02-20 | VERIFIED | CROSS RHODES | 2012-02-20 | THE CW |
| 5 | 16 | CROSS RHODES | 2012-02-20 | VERIFIED | CROSS RHODES | 2012-02-20 | iTUNES STORE |
| 5 | 16 | CROSS RHODES | 2012-02-20 | VERIFIED | CROSS RHODES | 2012-02-20 | HULU |

FIG. 4E

CRAFTED    DELETE

TITLE
IT GIRL, INTERRUPTED
EPISODE
S 5, E 19
ORIGINAL AIR DATE
2012-04-09
SYNDICATION ID

PARTS
DESCRIPTION
SERENA DECIDES TO STEP OUT OF THE SPOTLIGHT AND MAKE LOLA THE NEW "IT GIRL"; CHUCK ASKS BLAIR FOR ADVICE; DIANA'S RETURN IGNITES A POWER STRUGGLE WITH NATE.

ROOT ID
9163574
APOLLO ID
EP009322060115

TITLE
IT GIRL, INTERRUPTED
EPISODE
S 5 , E 19
AIR DATE
2011-04-09 (0:42:30)
CONTENT
VUDU    CASTTV

DESCRIPTION
SERENA DECIDES SHE IS READY TO RELINQUISH THE SPOTLIGHT AND SETS OUT TO MAKE A REDUCTANT LOLA (RECURRING GUEST STAR ELLA RAE PECK - THE GOOD WIFE) THE NEXT IT GIRL OF THE UPPER EAST SIDE, STARTING WITH MODELING AT A KIKI DE MONTPARNASSE PARTY AND LINGERIE SHOW. MEANWHILE, CHECK REACHES OUT TO **********

IMAGES

FIG. 4E (Cont.)

VIDEO MATCHING SERVICE TO OFFLINE COUNTERPART

RELATED APPLICATIONS

This patent arises from a continuation of U.S. patent application Ser. No. 15/187,663 (now U.S. Pat. No. 10,229, 198) entitled VIDEO MATCHING SERVICE TO OFFLINE COUNTERPART, which was filed on Jun. 20, 2016, which is a continuation of U.S. patent application Ser. No. 13/460, 477, entitled VIDEO MATCHING SERVICE TO OFFLINE COUNTERPART, filed Apr. 30, 2012, which is a continuation in part of U.S. patent application Ser. No. 11/891,301 (now U.S. Pat. No. 8,745,684) entitled FACILITATING MULTIMEDIA SEARCH, filed Aug. 8, 2007, which claims priority to U.S. Provisional Patent Application No. 60/821, 704, entitled TECHNIQUES FOR AUGMENTING THE TEXT INFORMATION AVAILABLE TO VIDEO SEARCH ENGINES filed Aug. 8, 2006. U.S. patent application Ser. Nos. 15/187,663, 13/460,477, 11/891,301, and 60/821,704 are hereby incorporated by reference in their entireties. Priority to U.S. patent application Ser. Nos. 15/187,663, 13/460,477, 11/891,301, and 60/821,704, is hereby claimed.

BACKGROUND

There is an increasingly large volume of video, audio, movie, television, music, and other media content ("asset" or "media asset") being published to the Internet and to the World Wide Web ("web") by asset providers. Videos can now be found on a wide variety of web sites. Videos are also found on the non-web portions of the Internet, such as on music stores, on peer-to-peer file sharing networks, and on Internet-enabled set top boxes.

Some assets are embedded on web pages using multimedia programs such as Flash. Some are stored on web servers and linked via HTML hyperlinks. Some are on a peer-to-peer network such as those using the BitTorrent protocol. Many media providers use proprietary web pages with assets classified using visible and intentionally/unintentionally obfuscated metadata.

Video search engines have been developed to search for Internet videos. Some video search engines allow searching for videos that are on web sites. Some video search engines allow searching for videos that are on peer-to-peer networks.

A common technique for web video search engines is to locate the text describing a particular video ("video description"), index the text, and subsequently return the associated video when a user's search query matches the video description. The video description may be extracted from the web page on which the video is embedded or linked from which it is linked or from the metadata of the video file. The video description is often short, limited, and/or vague. Therefore, a user's search query may not necessarily return the desired search results.

For peer-to-peer video search engines, queries may be set to match against the filename or metadata of the video. The metadata may include a video description that is similar to web video descriptions in that it is short, limited, and/or vague. Often there is only limited text associated with assets. For example, a web-embedded video may only have a short description consisting of the name of the show and the broadcast airdate of that particular episode of the show. In this case, search methodologies that use matching query word, word proximity, location of terms within the result, and so forth are unable to differentiate the ranking of different videos since the available words in the associated text are limited.

Publishers, media providers, and media aggregators/portals would be better served with either the ability to search and/or identify assets better.

BRIEF DESCRIPTION OF THE DRAWINGS

Various embodiments are disclosed in the following detailed description and the accompanying drawings.

FIG. 3 is a sample screenshot of a customer web site.

FIGS. 4A, 4B, 4C, 4D, and 4E are example screenshots of a portal to the matcher service.

DETAILED DESCRIPTION

Figure 1:
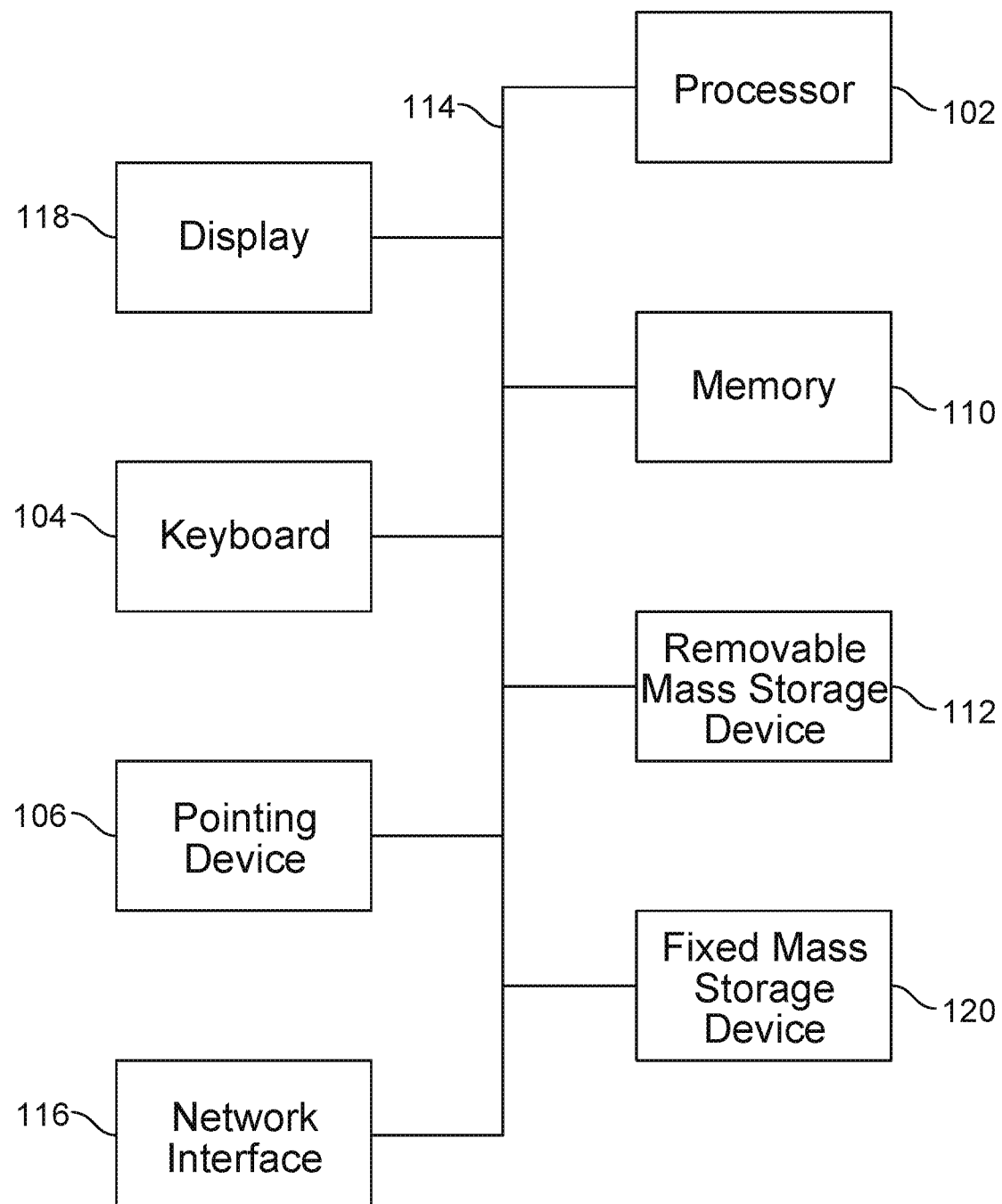
FIG. 1 is a functional diagram illustrating a programmed computer system for video matching in accordance with some embodiments.

This disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of this disclosure. This disclosure is described in connection with such embodiments, but the disclosure is not limited to any embodiment. The scope of this disclosure is limited only by the claims and the disclosure encompasses numerous alternatives, modifications and equivalents. Numerous specific details are set forth in the following description in order to provide a thorough understanding of this disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

There exists a comprehensive and/or canonical commercial database of media assets, for example the Tribune Media Services [TM] or "TMS Database" that contain a good source of information about media assets, for example descriptions of movies and television shows, which are usually production assets in the "offline" world—for example for the television media (over broadcast, cable and/or satellite). Online assets in their variety of proprietary forms would be better augmented with such an offline counterpart.

For a large set of audio and video on computer networks, there are fuller descriptions of, and additional information for, the videos available elsewhere on a network or in other electronic forms, especially in the canonical or other databases. For example, for many videos of television shows, episode recaps and summaries are very often available in the TMS database. Similarly, related information is available for many other types of videos as well, including news articles for news videos, "play-by-play" recaps for sports videos, scripts for movies, cast and crew information for entertainment videos, player and team information for sports videos, music videos, music and/or band histories, and so forth.

Augmenting an online asset with its offline counterpart is disclosed. Throughout this specification the example of a video asset is given without loss of generality; the same techniques may be used for music assets, audio assets, image assets, or any other multimedia assets. In some embodiments, an online video is analyzed to retrieve metadata considered an "attribute" of the asset, for example a play-length, a description of a cast and/or crew, or a title. Some attributes may be considered a "strong signal" in relation to other attributes, for example cast and/or crew. The attributes of the online video are used to match it to a corresponding database entry in the (offline) commercial database. A pointer may be returned to the entry, for example a TMS ID™, an industry-standard unique identifier for the TMS database.

A customer of this matcher service to an offline counterpart uses it for search and/or to tell as much as possible about an online asset that they own, license or associate with. Without using complex and error-prone video content analysis (for example, motion image processing) the matcher can map assets being provided online with canonical programs, enriching the online asset's metadata like title, description, season/episode number, and/or recognizing the video as adult-rated and/or spam.

In some embodiments, when indexing a video embedded on a web page or linked to from a web page, a program first locates the available video description, filename, and other attributes ("metadata"). A set of rules is applied to the metadata to classify the video. If a video is successfully classified, an agent uses the classification to match with additional information data associated with the video in the database.

FIG. 1 is a functional diagram illustrating a programmed computer system for video matching in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
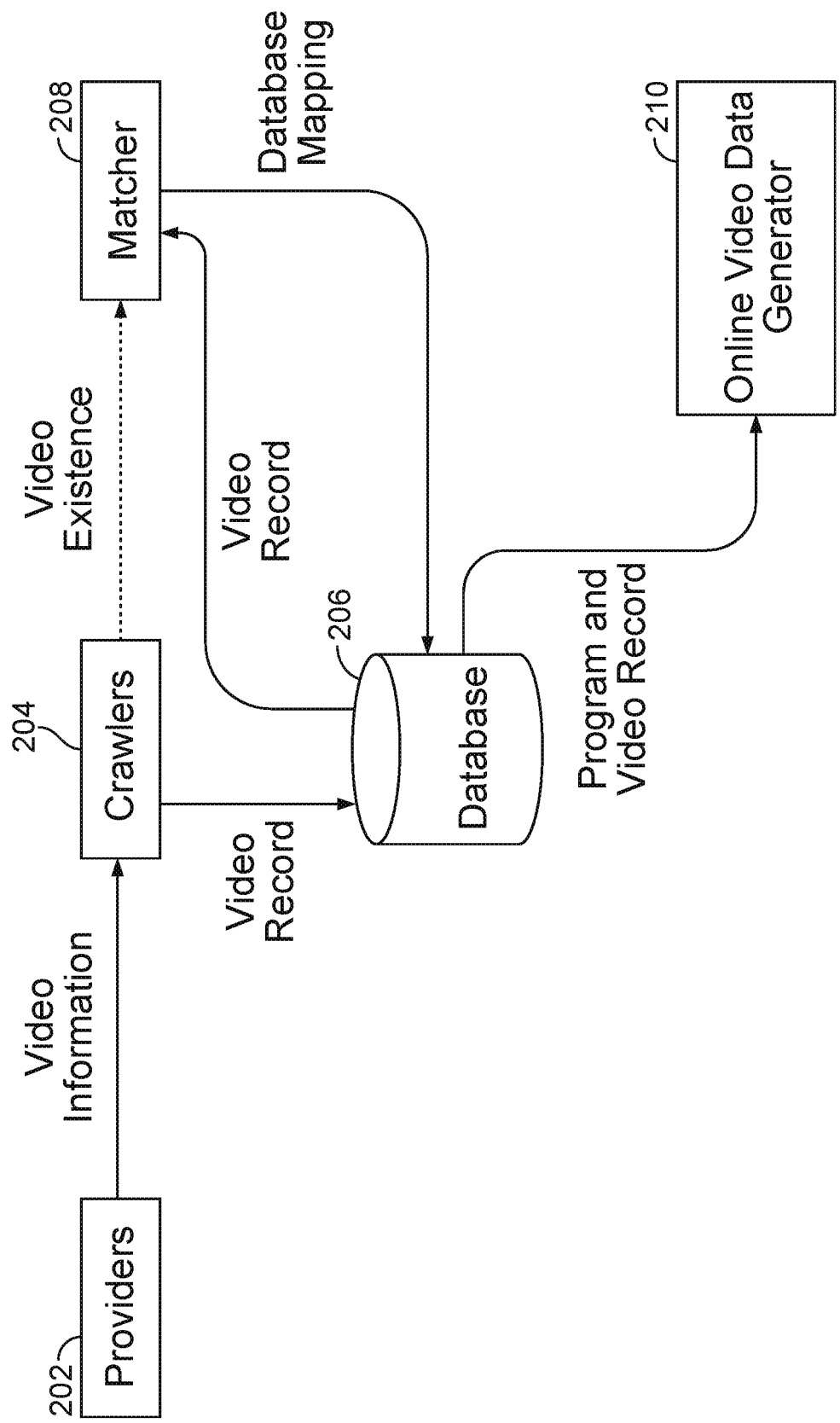
FIG. 2 is a block diagram illustrating an embodiment of a video matching service.

FIG. 2 is a block diagram illustrating an embodiment of a video matching service. Providers 202 include providers of online assets, for example television studios, movie studios, and any intermediary for video distribution.

Providers 202 are coupled to crawlers 204, which include web crawlers to locate video on computer networks (which may be connected to an indexing engine that generates and maintains an index and/or a web agent which obtains additional information associated with videos). Crawlers 204 may also include humans, API calls (published and unpublished), feeds, sitemaps, web crawlers, apps and/or applications who submit an unknown online video's existence (or the video itself) to the matcher 208. Crawlers 204 may use HTML-scraping and/or JSON/XML-scraping, via an unpublished/published API or by traditional crawling.

Crawlers 204 are also coupled to database 206 which includes a commercial de facto standard database for video program attributes, for example the TMS Database™. In some embodiments database 206 may include or be supplemented by open-sourced sources like Wikipedia™, TVRage™, and/or MusicBrainz™. Database 206 is coupled to matcher 208, which includes a method, system, and/or program for matching the unknown online video from crawler 204 to a video in database 206.

Database 206 is also coupled to Online Video Data ("OVD") Generator 210, which includes a method, system, and/or program for generating data based on the program and video records for the previously unknown online video for consumption by a customer (not shown). A customer may include, for example, a designer or implementor of an onscreen display/browser of television/movie programs and/or schedules. In some embodiments the providers 202 and/or crawlers 204 and/or customers are from the same or partnership organizations.

Provider 202 provides video information to crawlers 204. In some cases the crawler 204 first requests the information from provider 202 as part of an access of an online video, or by browsing a related page. Crawler 204 may include techniques for parsing the online video or related page to determine video information and/or video attributes such as one or more of the following:

A unique identifier, for example a TMS ID;
A Uniform Resource Locator ("URL") associated with the online video;
A video title;
A descriptive text field;
A season number and/or episode number;
An indication of whether a consumer has to pay to access the video and/or a price;
A video format and/or whether the video is in high definition ("HD"), three-dimensions ("3D"), etc;
A video airdate or movie release year (or date);
A show, genre or tags associated with the video;
A video duration length;
A rating, for example a Motion Pictures Association of America ("MPAA") rating;
A director name and/or a country associated with the video (production);
A television, movie or video network associated with the video;
An indication whether the video is spam and/or for adults-only;
An Internet Movie Database ("IMDb") URL and/or rating;
An episode guide and/or Subtitles URL;
A tagline;
An identifier or other data related to syndication;
A plot description; and
A list of cast and/or crew.

In some embodiments, such attributes may be prioritized towards "strong signal" attributes like a list of cast and/or crew over weaker signals like a tagline.

Crawlers 204 may recognize and/or receive the existence of an unknown online video asset and signal to the matcher the existence of such an asset. Crawler 204 may pass a record of the video to database 206 and subsequently to matcher 208. The record may include a URL or other address for the video, and/or attributes related to the video. As described in detail later in this specification, the matcher 208 uses metadata (including the video record) to determine if and whether the video maps to an existing entry in the database 206. If the video does map an existing entry in the database, the full entry is used to enhance or enrich the program and/or video record for the OVD Generator 210.

FIG. 3 is a sample screenshot of a customer web site. The customer may use the OVD Generator 210 from FIG. 2.

This particular customer aggregates videos from at least six imaginary providers 202: Hulru, The WM, XCable, Amazar.com, iTones Store and VODO. The video matching system shown in FIG. 2 allows the customer to recognize videos at these providers as being the same video: From a fictional show "Nilita" 302, entitled "Doublecrest" 304, all six providers show Season 2 Episode 16 (First Aired: Mar. 16, 2012) 306, with a description 308.

As the customer has mapped this particular episode to all six providers, it can show to its consumer two collections; 1) a collection of free providers 310 who will show the consumer the episode without cost, beyond in some cases advertising, and 2) a collection of paid providers 312 who will the consumer the episode at a price (in this case with enhanced quality like HD) and/or subscription.

FIGS. 4A, 4B, 4C, 4D, and 4E are example screenshots of a portal to the matcher service. The portal may be used by developers of the matcher 208 or may be developed as an interface for a customer and/or provider 202.

Figure 4A:

FIG. 4A shows a dashboard-type "movie matcher" interface for the portal including an interface for manually matching a movie (402) and an interface to search for a movie (404). Searching for a movie includes finding a video in the database 206 (shown on the left-hand column of the dashboard) and/or finding matches for the video in previously crawled and/or previously unknown video assets (shown on the right-hand column of the dashboard). The matches may include matched, verified, and/or potential matches for the video in question.

Figure 4B:

FIG. 4B shows a dashboard-type "unmatched video report" interface for the portal including an interface for reporting, filtering, and/or blacklisting video matches over a time period for a set of crawlers 204. In this example the shows are sorted by greatest-to-least unmatched videos (412) including a particular movie (414) with 4 unmatched videos.

Figure 4C:
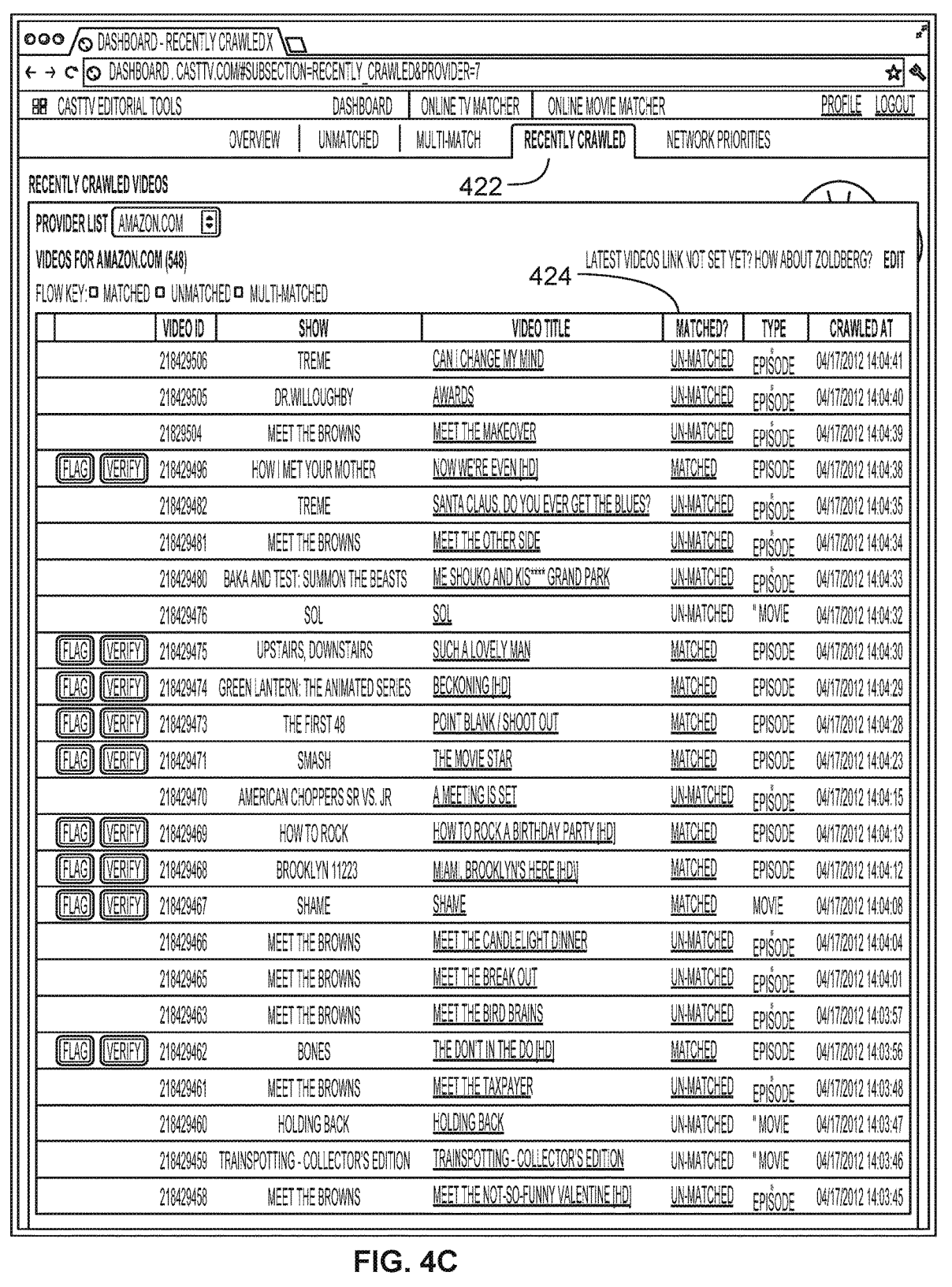

FIG. 4C shows a dashboard-type "recently crawled" interface for the portal including an interface for reporting recently crawled videos (422) by provider 202. In this example a colored row key is given to show matched, unmatched, and multi-matched videos and a row-based report (424). Each matched video is given an option to either "flag" the automated match as questionable by a manual operator, or to "verify" the automated match.

FIG. 4D shows a "matching" interface for the portal, including if a manual operator indicates to verify a match for a particular show or movie. In this example a manual operator selects on the left-hand column (432) a specific season and episode number of a particular show. On the right-hand column (434) the online videos that have been matched to the offline counterpart, the specific season and episode of the show, are shown from various providers 202, and their current state; "matched" or "verified". There is also a list of unmatched videos (435). Along the bottom row there is a match that a manual operator can either verify or remove verification. On the left-hand side (436) are attributes of the online video in question. On the right-hand side (438) are attributes of the canonical entry in database 206.

FIG. 4E shows an "advanced matching" interface for the portal, including if a manual operator indicates to verify a match for a particular show or movie. In this example, a manual operator selects a show and sees an 'exploded' view by season, episode and provider 202. The list includes the state of the match, including a state of being matched, verified and crafted, which in some embodiments comprises an editorially produced match. Along the bottom row there is a match that a manual operator can either verify or remove verification, or craft or delete the crafted match. On the left-hand side are attributes of the online video in question. On the right-hand side are attributes of the canonical entry in database 206.

Figure 5:
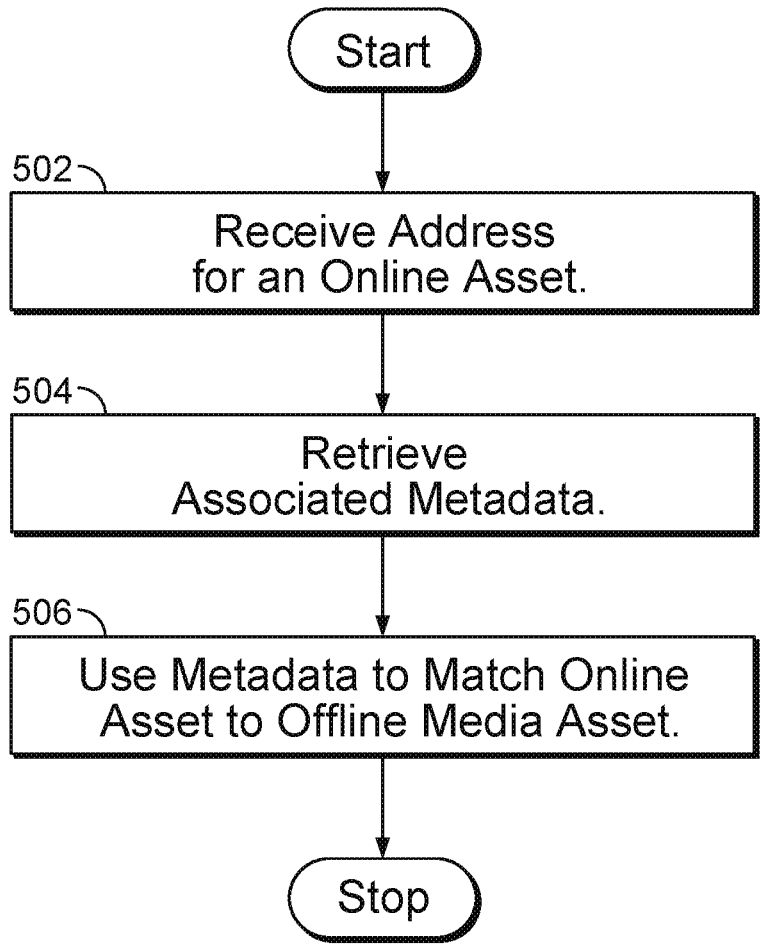
FIG. 5 is a flowchart illustrating an embodiment to match online videos to offline counterparts.

FIG. 5 is a flowchart illustrating an embodiment to match online videos to offline counterparts. In some embodiments the process of FIG. 5 is performed by matcher 208.

In step 502, an address is received for an online asset. In some embodiments, the address is included with the video itself. An address may include a URI, URL, a feed, an internet address, a brand, a program, and so on. In step 504, associated metadata is retrieved. As described above, the associated metadata includes video attributes. In some embodiments crawler 204 extracts the metadata when it discovers the video. Crawler 204 may also process the metadata to determine identifying video attributes. These identifying attributes are classified in order to associate the video as belonging to an isolated, unique episode or event for which additional information is available.

For example, for a video related to a television show, the identifying attributes may be classified to associate the video as belonging to a specific episode of the television show. Another example is that the video attributes like the description associated with the video may be extracted by using one of many techniques, including but not limited to using regular expressions, Document Object Model (DOM) tree traversal, and other methods to locate one or more blocks of text. For example, a program can be developed to locate the text string enclosed in <p> tags immediately after the <embed> tags. In some embodiments, different rules may be used to locate video descriptions on different provider 202 websites because of different layouts and formats of different web pages.

In some embodiments, site-specific rules are used to parse the metadata. In some embodiments the set of parsing rules is applied to obtain the name of show, the name of the episode, and the airdate of the episode. For example, the video data for a video related to a television show may include the video description "Star Trak Moment—'Tomorrow' (Airdate: Feb. 1, 1968)," and the parsing rules obtain the name of the show as "Star Trak", the name of the episode as "Tomorrow" and the airdate of the episode as Feb. 1, 1968.

In step 506, the metadata and/or attributes are used to match the online asset to an offline media asset, for example a television show, a movie, a musical, a music track, a sports event, and/or a concert. In some embodiments, a database is queried with the results of the parsing in 504 to obtain identifying information about the video. In some embodiments, a video classified with the name of the show, the name of the episode, and the airdate, can be programmatically matched to a unique episode by querying an episode database that includes the name of the show, the name of the episode, the season number, and the episode number. In some embodiments, the season number can be deduced from the name of the show and the airdate of the episode.

For example, a video associated with a television show called "Star Trak", an episode "Tomorrow" and the airdate Feb. 1, 1968 may be classified as matching season 2, episode 18 of the show "Star Trak". In some embodiments an episode database may be available online or in other electronic forms. For other types of videos such as sports and news, similar classification rules are developed to obtain a match against a unique event. If it is determined that the provider is new or newer and no or little site-specific rules have been established, user intervention may be requested to manually establish rules to parse the metadata; the rules may then be stored as site-specific rules for future processing.

Figure 6:
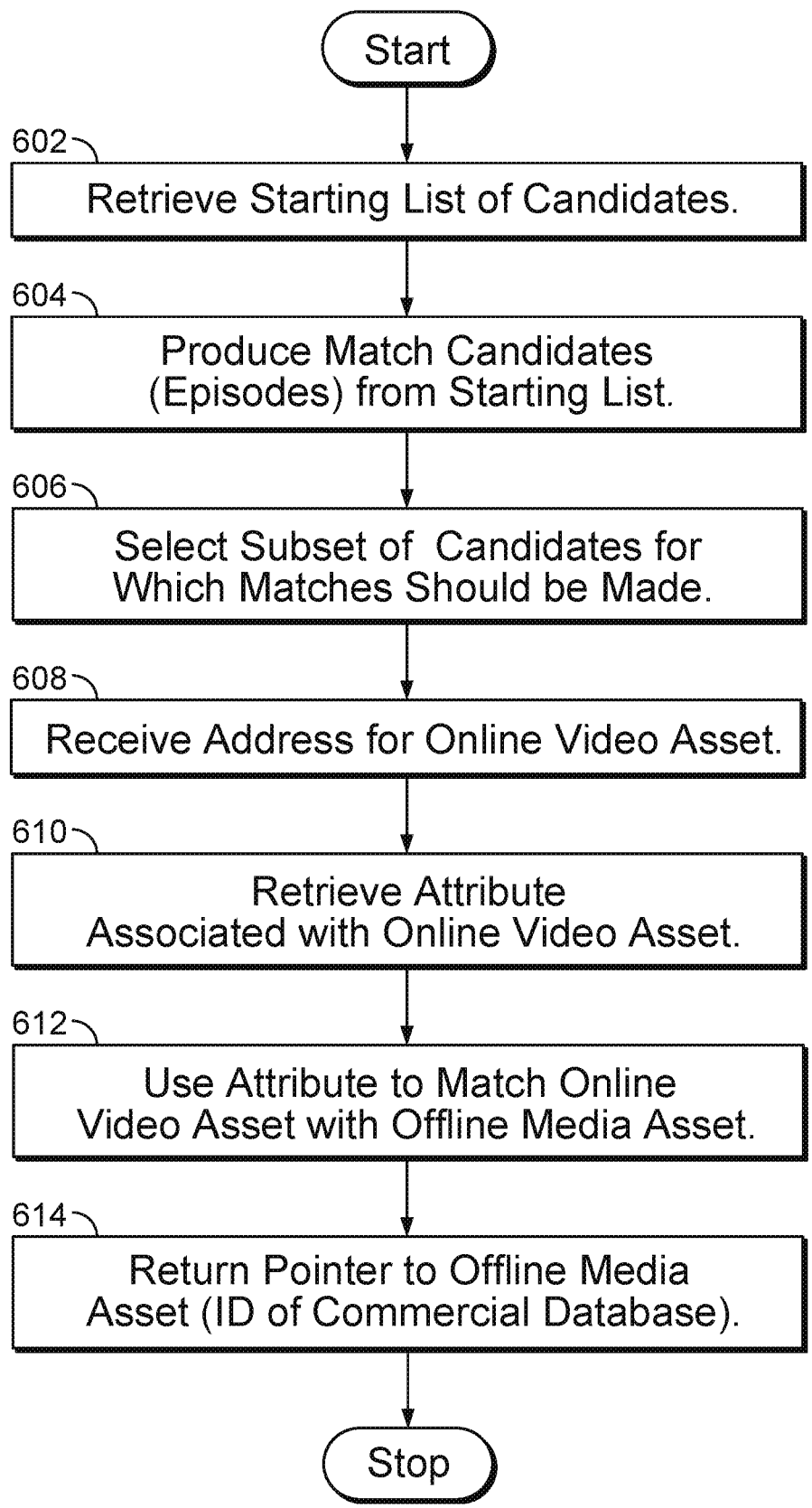
FIG. 6 is a flowchart illustrating an alternate embodiment to match online videos to offline counterparts.

FIG. 6 is a flowchart illustrating an alternate embodiment to match online videos to offline counterparts. In some embodiments the process of FIG. 5 is performed by matcher 208.

In step 602, a candidate list of series is used to start with. For example, a given customer may only be interested in providing services for "Star Trak" and "Nilita". In step 604, the series candidates are used to produce match candidates and/or episodes. For example a search engine and/or database queries may be used on nearby airdates and/or episode numbers. In step 606, a subset of candidates for which matches should be made are selected. For example, the given customer may only be interested in 1968 episodes of "Star Trak" or Season 3 of "Nilita". Steps 608, 610, and 612 correspond to steps 502, 504, and 506 of FIG. 5, respectively. In step 614, a pointer is returned to an offline media asset, for example a unique identifier to an entry in the database 206, like a TMS ID. The pointer may be an ID field of a commercial database of media asset listings.

Figure 7:
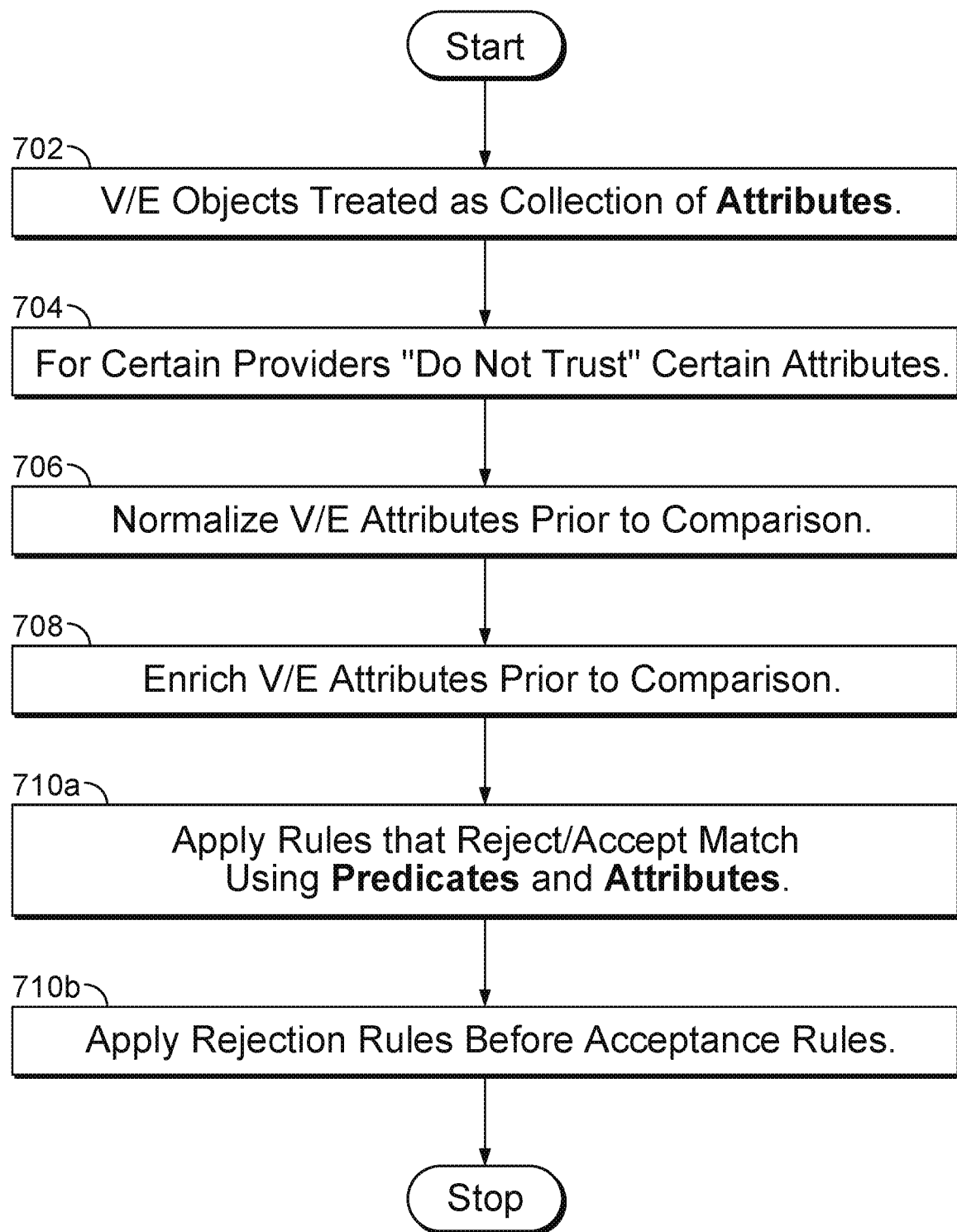
FIG. 7 is a flowchart illustrating an embodiment to use metadata to match online assets.

FIG. 7 is a flowchart illustrating an embodiment to use metadata to match online assets. In some embodiments the process of FIG. 7 is performed by matcher 208 in step 506/612 of FIGS. 5/6. The matcher 208 may start out with a "video-episode" ("V-E") pair; the video being the online asset and the episode being a corresponding offline media asset, for example corresponding to an entry in the database 206. Without loss of generality, the process described for a television show episode may be simply generalized for other video, audio or other multimedia asset. The questions asked thus is: Given a V-E pair, do they match?

In step 702 each of the V-E pair, the V or video object and the E or episode object are treated as a collection of attributes. In step 704, for certain providers 202, a subset of attributes are not "trusted" and discounted in future analysis.

In step 706 one or more of the V and/or E attributes are normalized prior to comparison. For example, if a title includes the description terms "HD", "SD" (Standard Definition), 3D, and/or Director's Cut, the normalization may include positioning the descriptive term in the same position within a title string. Similarly, if a title includes the other terms "Unrated Edition", "(2010)" and/or "Deluxe", the normalization may include deleting the other term from the title, and may include moving the other term to another attribute.

In some embodiments, Roman numerals in a title are normalized by converting them to an integer, for example "Rockhead II" may be normalized to "Rockhead 2". In some embodiments descriptions of cast and crew may be normalized by alphabetically sorting the cast and crew instead of ordering by appearance order, or vice versa.

In step 708, one or more of the V and/or E attributes are enriched prior to comparison. For example, an episode number may be extracted from the title, either literally (for a V-Title attribute of "Nilita Episode 3" the V-Episode Number attribute is extracted as 3) or by way of lookup, for example by realizing that Nilita Episode 3's title is "One Fun" and recognizing the V-Title attribute is also "One Fun", thus the V-Episode Number attribute is extracted as 3.

In some embodiments, other techniques for normalization and/or enriching include:
Stripping accents;
Stripping HTML entities and/or garbage;
Normalizing plural possessions;
Stripping a show name;
Compressing acronyms (which may result in A.C.T." changing to "ACT");
Normalizing numbers (which may result in changing "split second" to "split 2nd" and "I am legendary" to "1 am legendary".);
Extracting a special like a TV special to look for items like a "Halloween special";
Normalizing and/or removing punctuation with or without endings;
Recognizing non-empty grouping, possible meta chunks, and/or non-letter/number/space characters (for example symbols or unprintable characters);
Recognizing video "stopwords" like HD, Enhanced, Extended;
Converting the time "noon" to 12:00 pm;
Standardizing between the term "version" or "edition"; and
Standardizing between the terms "high definition", "720p", "1080i", "1080p", "high definition quality", "hi definition", "hi def quality", and so on for high definition and/or standard definition.

In step 710 a, the matcher may apply rules that reject or accept a match using predicates and attributes. Predicates may include one or more of the following: a distance, an equality, a intersection, a similarity and a Levenshtein similarity. This distance may include interpreting play duration. The similarity may include interpreting Roman numerals as described above. For example, a Levenshtein similarity may be applied to the title attribute, such that unintentional misspellings in an online video title attribute are still matched (for example, "Yesteruear" is recognized as matching "Yesteryear"). This step is further detailed in step 710 b where rejection rules are applied before acceptance rules.

Although the foregoing embodiments have been described in some detail for purposes of clarity of understanding, this disclosure is not limited to the details provided. There are many alternative ways of implementing this disclosure. The disclosed embodiments are illustrative and not restrictive.

What is claimed is:

1. A tangible computer readable storage disk or storage device comprising instructions that, when executed, cause at least one processor to at least:
access an address for an online media asset;
access metadata associated with the online media asset, wherein the metadata includes a first asset attribute, the first asset attribute to represent a title of the online media asset;
normalize the first asset attribute by changing a location of a first descriptive term of the first asset attribute from a first position to a second position in the first asset attribute, removing a second descriptive term from the first asset attribute, and adding the second descriptive term to a second asset attribute, the first descriptive term separate from the second descriptive term, the first asset attribute separate from the second asset attribute;
determine whether the normalized first asset attribute identifies at least one of a cast member or crew member; and
in response to the first asset attribute identifying the at least one of the cast member or the crew member, match the online media asset to an offline media asset stored in a local media asset database, the matching performed by prioritizing offline media assets having a matching normalized first asset attribute that matches the at least one of the cast member or the crew member, the offline media asset including at least one of audio or video.

2. The tangible computer readable storage disk or storage device of claim 1, wherein the instructions, when executed, further cause the at least one processor to return an asset identifier identifying to the offline media asset.

3. The tangible computer readable storage disk or storage device of claim 2, wherein the asset identifier is an ID field of a commercial database of media asset listings.

4. The tangible computer readable storage disk or storage device of claim 1, wherein both the online media asset and the corresponding offline media asset are videos.

5. The tangible computer readable storage disk or storage device of claim 4, wherein the videos are one or more of the following: television shows, television episodes, movies, television series, music videos, televised sports events, or televised events.

6. The tangible computer readable storage disk or storage device of claim 1, wherein the instructions, when executed, further cause the at least one processor to:
retrieve a first candidate list of series;
produce a set of matching candidate episodes from the first candidate list of series; and
determine a subset of episodes from the set of match candidate episodes, wherein the corresponding offline media asset is one of the subset of episodes.

7. The tangible computer readable storage disk or storage device of claim 1, wherein the normalizing of the first asset attribute further includes converting a roman numeral to an integer.

8. An apparatus comprising:
at least one processor; and
memory including machine readable instructions that, when executed, cause the at least one processor to at least:
access an address for an online media asset;
access metadata associated with the online media asset, wherein the metadata includes a first asset attribute, the first asset attribute to represent a title of the online media asset;
normalize the first asset attribute by changing a location of a first descriptive term of the first asset attribute from a first position to a second position in the first asset attribute, removing a second descriptive term from the first asset attribute, and adding the second descriptive term to a second asset attribute, the first descriptive term separate from the second descriptive term, the first asset attribute separate from the second asset attribute;
determine whether the normalized first asset attribute identifies at least one of a cast member or crew member; and
in response to the first asset attribute identifying the at least one of the case member or the crew member, match the online media asset to an offline media asset stored in a local media asset database, the matching performed by prioritizing offline media assets having a matching normalized first asset attribute that matches the at least one of the cast member or the crew member, the offline media asset including at least one of audio or video.

9. The apparatus of claim 8, wherein the instructions, when executed, further cause the at least one processor to return a pointer to the offline media asset.

10. The apparatus of claim 9, wherein the pointer is an ID field of a commercial database of media asset listings.

11. The apparatus of claim 8, wherein both the online media asset and the corresponding offline media asset are videos.

12. The apparatus of claim 11, wherein the videos are one or more of the following: television shows, television episodes, movies, television series, music videos, televised sports events, or televised events.

13. The apparatus of claim 8, wherein the instructions, when executed, further cause the at least one processor to:
retrieve a first candidate list of series;
produce a set of match candidate episodes from the first candidate list of series; and
determine a subset of episodes from the set of match candidate episodes, wherein the corresponding offline media asset is one of the subset of episodes.

14. The apparatus of claim 8, wherein the instructions, when executed, further cause the at least one processor to normalize the first asset attribute by converting a roman numeral to an integer.

15. A method comprising:
accessing an address for an online media asset;
accessing metadata associated with the online media asset, wherein the metadata includes a first asset attribute, the first asset attribute to represent a title of the online media asset;
normalizing the first asset attribute by changing a first location of a first descriptive term of the first asset attribute from a first position to a second position in the first asset attribute, removing a second descriptive term from the first asset attribute, and adding the second descriptive term to a second asset attribute, the first descriptive term separate from the second descriptive term, the first asset attribute separate from the second asset attribute;
determining whether the normalized first asset attribute identifies at least one of a cast member or crew member; and
in response to the first asset attribute identifying the at least one of the cast member or the crew member, matching the online media asset to an offline media asset stored in a local media asset database, the matching performed by prioritizing offline media assets having a normalized first matching asset attribute that matches the at least one of the cast member or the crew member, the offline media asset including at least one of audio or video.

16. The method of claim 15, further including returning a pointer to the offline media asset.

17. The method of claim 16, wherein the pointer is an ID field of a commercial database of media asset listings.

18. The method of claim 15, wherein both the online media asset and the corresponding offline media asset are videos.

19. The method of claim 18, wherein the videos are one or more of the following:
television shows, television episodes, movies, television series, music videos, televised sports events, or televised events.

20. The method of claim 15, further including:
retrieving a first candidate list of series;
producing a set of match candidate episodes from the first candidate list of series; and
determining a subset of episodes from the set of match candidate episodes, wherein the corresponding offline media asset is one of the subset of episodes.

* * * * *